United States Patent [19]

Dalton

[11] Patent Number: 4,881,361
[45] Date of Patent: Nov. 21, 1989

[54] WHEELED VEHICLES FOR GROUND WORK

[75] Inventor: John F. Dalton, Devon, Pa.

[73] Assignee: Cameron Constructors, Inc., Newark, Del.

[21] Appl. No.: 101,514

[22] Filed: Sep. 28, 1987

[51] Int. Cl.⁴ ............................................. A01O 34/68
[52] U.S. Cl. ...................................... 56/17.5; 56/255; 56/10.8; 56/DIG. 18; 180/19.3
[58] Field of Search ...................... 56/16.7, 16.9, 17.1, 56/17.5, 320.1, 320.2, 255, 10.8, 11.8, DIG. 18; 180/19.5 R, 19.1

[56] References Cited

U.S. PATENT DOCUMENTS

| | | | |
|---|---|---|---|
| 2,731,096 | 1/1956 | Thelander | 180/19 |
| 2,763,492 | 9/1956 | Phelps | 56/255 |
| 2,765,861 | 10/1956 | Ekas | 180/12 |
| 2,978,857 | 4/1961 | Smith et al. | 56/11.2 |
| 3,029,887 | 4/1962 | Schantz | 180/19.3 |
| 3,110,352 | 11/1963 | McClarnon | 180/26 |
| 3,174,471 | 3/1965 | Weglage et al. | 56/10.8 |
| 3,425,197 | 2/1969 | Kita | 56/249 |
| 3,539,195 | 11/1970 | Swanson et al. | 280/92 |
| 3,764,156 | 10/1973 | Nepper et al. | 56/DIG. 18 |
| 4,099,366 | 7/1978 | Peterson | 56/255 |
| 4,162,605 | 7/1979 | Olin et al. | 56/7 |
| 4,182,100 | 1/1980 | Letter | 56/16.7 |
| 4,212,141 | 7/1980 | Miyazawa et al. | 56/11.8 |
| 4,690,235 | 9/1987 | Miyakoshi | 180/210 |

FOREIGN PATENT DOCUMENTS 844429  8/1960  United Kingdom ................. 56/17.1

OTHER PUBLICATIONS

Commercial brochure entitled "Excel Hustler 275, 295 and 305D", 12 pages.
Commercial brochure entitled "Powered Lawn and Garden Equipment-They come to us the World Over . . . Little Wonder", 8 pages.
Commercial brochure entitled "Yazoo Front-Cutting Industrial Tractors", 8 pages.

*Primary Examiner*—John Weiss
*Attorney, Agent, or Firm*—Panitch, Schwarze, Jacobs & Nadel

[57] ABSTRACT

A ground-working vehicle including a chassis, at least three ground-contacting wheels coupled with the chassis for supporting and moving the vehicle on the ground and an implement coupled with the chassis for working on the ground, at least beneath one side of the chassis, while the vehicle is in motion. A first one of the wheels is positioned opposite the one side of the chassis and mounted for rotation about only a single axis extending generally towards the one side of the chassis. Each of the at least two other wheels are mounted for rotation about two axes including a vertical pivot axis. The pivot axes are asymmetrically spaced from the first wheel to enhance the operability and maneuverability of the vehicle in various configurations. Also, a portion of the ground-working implement extends away from the first wheel beyond the two pivotable wheels towards the opposing side of the vehicle so that the implement can be brought up flush against obstacles and passed under overhanging obstacles which interferingly contact either or both of the pivoting wheels or their chassis supports. For hand-controlled vehicles, a handle is provided generally at a center portion of the chassis in the vicinity of the center of gravity.

22 Claims, 3 Drawing Sheets

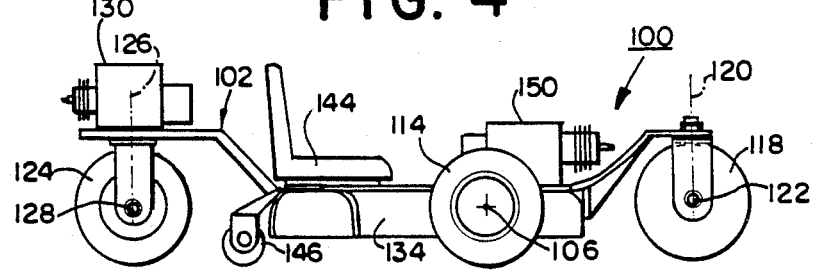
FIG. 4
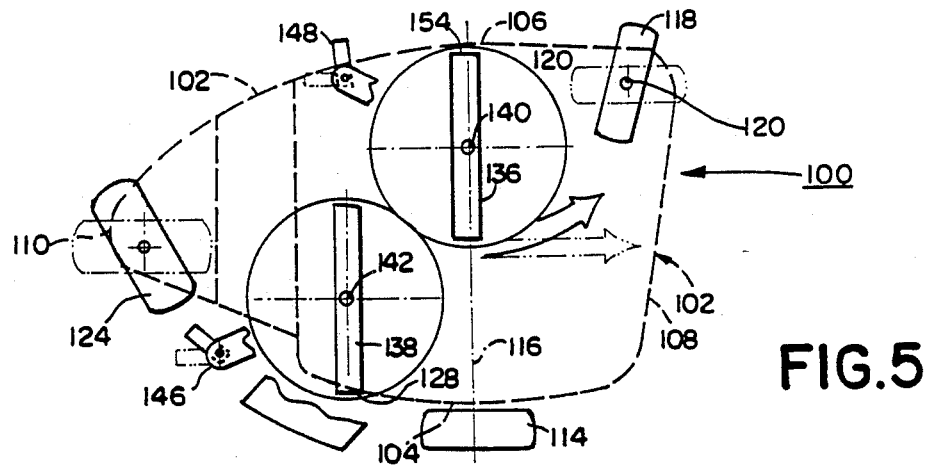
FIG. 5
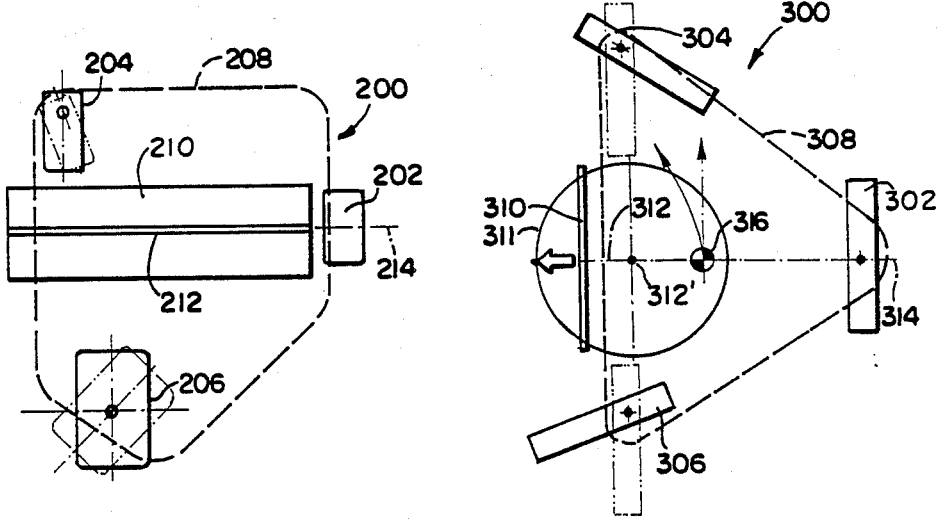
FIG. 6
FIG. 7

WHEELED VEHICLES FOR GROUND WORK

FIELD OF THE INVENTION

The invention relates to wheeled vehicles and, in particular, to vehicles carrying ground-working implements whose usefulness would be enhanced by having a zero radius turning capability.

BACKGROUND OF THE INVENTION

Conventional vehicles utilize three or four wheels for support and steering, typically with two of the wheels (non-steering) fixedly mounted for rotation along a common axis. It is well-known that these vehicles can turn only about a point located along the common axis.

For example, most conventional hand-controlled lawn mowers typically have a four-wheel support. Most conventional edger/trimmers use a three-wheel support. Both types of vehicles have at least two, non-steerable wheels on fixed axles coaxially mounted. Steering is accomplished by pushing down on a handle of either vehicle to lift all but two, non-steerable wheels off the ground and then rotating the vehicle about some point on the axis of the two wheels.

Because of their overall geometry, conventional lawn mowers cannot mow in a sharp turn, overlap in a 180 degree turn or perform their functions for 360 degrees around any radius, down to zero, in a continuous forward motion without being at least partially raised off the ground. The inability of conventional type riding work vehicles such as riding mowers, sweepers, paint stripers, Zambonis, etc. to raise one or more of their wheels off the ground also prevents these vehicles from being able to maneuver in this way.

The present invention provides an arrangement for a wheeled work vehicle which enables the vehicle to be maneuvered in sharp turns, to be reversed upon itself and otherwise to be able to be maneuvered and turned within any radius down to zero without raising any portion of the vehicle off the ground.

The present invention provides an arrangement for hand propelled and/or controlled work vehicles such as lawn mowers which do not require partial lifting of the vehicle in order to turn the vehicle.

The present invention also provides an arrangement for wheeled vehicles capable of supporting a ground-working implement which would enable the vehicle to be turned in any direction and with any radius of turning with respect to the implement while in operation.

SUMMARY OF THE INVENTION

Briefly stated, the present invention is, in one aspect, a work vehicle comprising a chassis generally having front, rear, first lateral and second lateral sides and at least three mutually-spaced, ground-contacting wheels coupled with the chassis for supporting and moving the vehicle on the ground. A first one of the three wheels is positioned generally on the first lateral side of the chassis and is mounted for rotation about only a generally horizontal first axis extending generally toward the second lateral side. A ground-working implement is coupled with the chassis for working at least generally beneath the second lateral side of the chassis generally opposite the first wheel. A second one of the three wheels is positioned generally to a front side of the first axis and is mounted for rotation about two axes including a generally vertical pivot axis. A third one of the three wheels is positioned generally to a rear side of the first axis and is mounted for rotation about two axes including a generally vertical pivot axis. The second and third wheels are asymmetrically mounted with respect to the first wheel.

In another aspect, the invention is a work vehicle comprising a chassis having generally front, rear, first lateral and second lateral sides and at least three mutually-spaced, ground-contacting wheels coupled with the chassis for supporting and moving the vehicle on the ground. A first one of the three wheels is positioned generally on the first lateral side of the chassis and is mounted for rotation about only a generally horizontal first axis, the first axis extending generally toward the second lateral side. A first ground-working implement is coupled with the chassis for working at least generally beneath the second lateral side of the chassis generally opposite the first wheel. A second one of the three wheels is positioned generally to a front side of the first axis and is mounted for rotation about a pair of axes including a generally vertical pivot axis. A third one of the three wheels is positioned generally on a rear side of the first axis and is mounted for rotation about two axes including a generally vertical pivot axis. A handle is coupled with the chassis for rotation about a second axis extending generally between the first and second lateral sides and located approximately midway between the front and rear sides of the chassis.

In yet another aspect the invention is, in particular, a lawn mower comprising: a housing having front, rear, first lateral and second lateral sides. A grass-cutting blade is supported for rotation generally within the housing. A motor is supported by the housing and coupled with the blade for rotation of the blade about an axis. A first wheel is coupled with the housing about midway along the first lateral side of the housing, the first wheel being mounted for rotation about only a generally horizontal first axis, extending generally towards the second lateral side. At least second and third wheels are each coupled with the chassis spaced from one another and the first wheel for supporting and moving the mower on the ground with the first wheel. Each of the second and third wheels is mounted for rotation about two axes including a generally vertical pivot axis. A portion of the blade extends between and beyond the second and third wheels, away from the first wheel and toward the second lateral side of the housing when the blade is substantially parallel to the first axis.

BRIEF DESCRIPTION OF THE DRAWINGS

The foregoing summary, as well as the following detailed description of the preferred and other embodiments in the invention, will be better understood when read in conjunction with the appended drawings. For the purpose of illustrating the invention, there is shown in the drawing embodiments which are presently preferred, it being understood, however, that the invention is not limited to the precise arrangements and instrumentality shown. In the drawings:

FIG. 4 is a diagrammatic side elevation of a riding lawn mower embodiment of the present invention;

FIG. 5 is a diagrammatic plan layout of the wheels and lawn mower blades of the embodiment of FIG. 4;

FIG. 6 is a diagrammatic plan layout of the wheels for an alternate embodiment of the invention;

FIG. 7 is a diagrammatic plan layout for an edger/trimmer in accordance with the present invention.

DETAILED DESCRIPTION OF THE INVENTION

Figure 1:
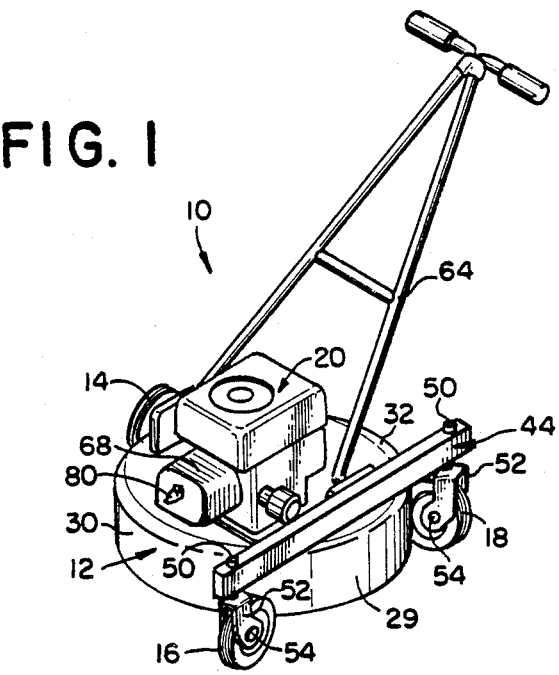
FIG. 1 is a diagrammatic perspective view of a hand-guided lawn mower in accordance with the present invention.

In the figures, like reference numerals refer to like elements.

Figure 3:
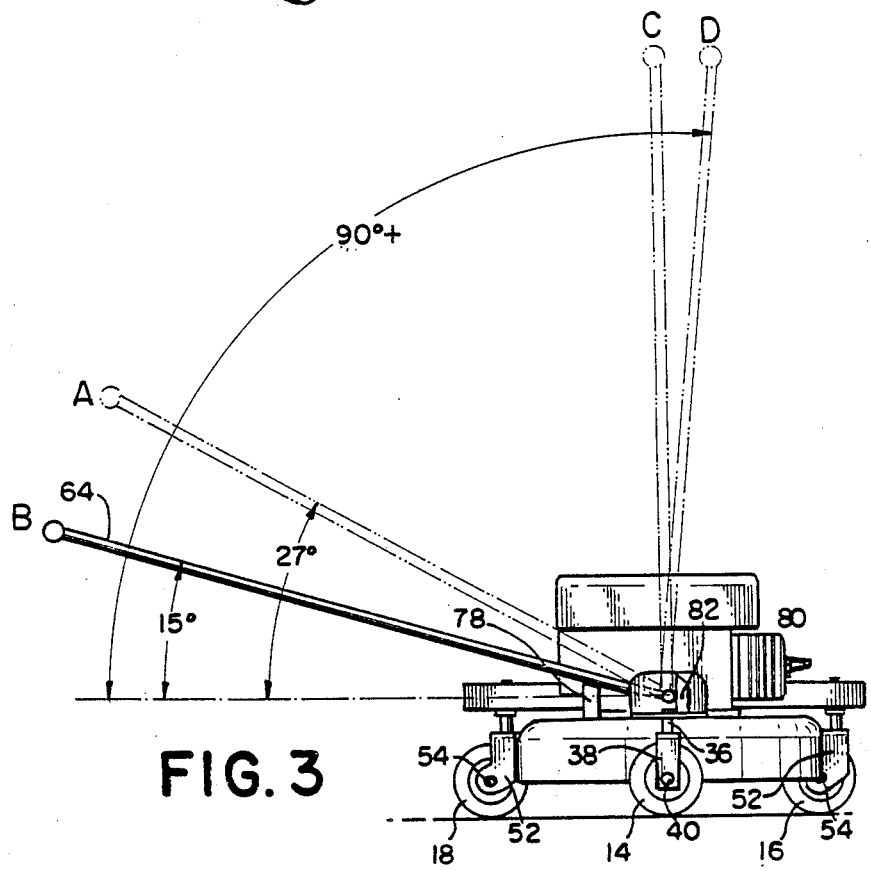
FIG. 3 is a diagrammatic side elevation of the lawn mower of FIGS. 1 and 2.
Figure 2:
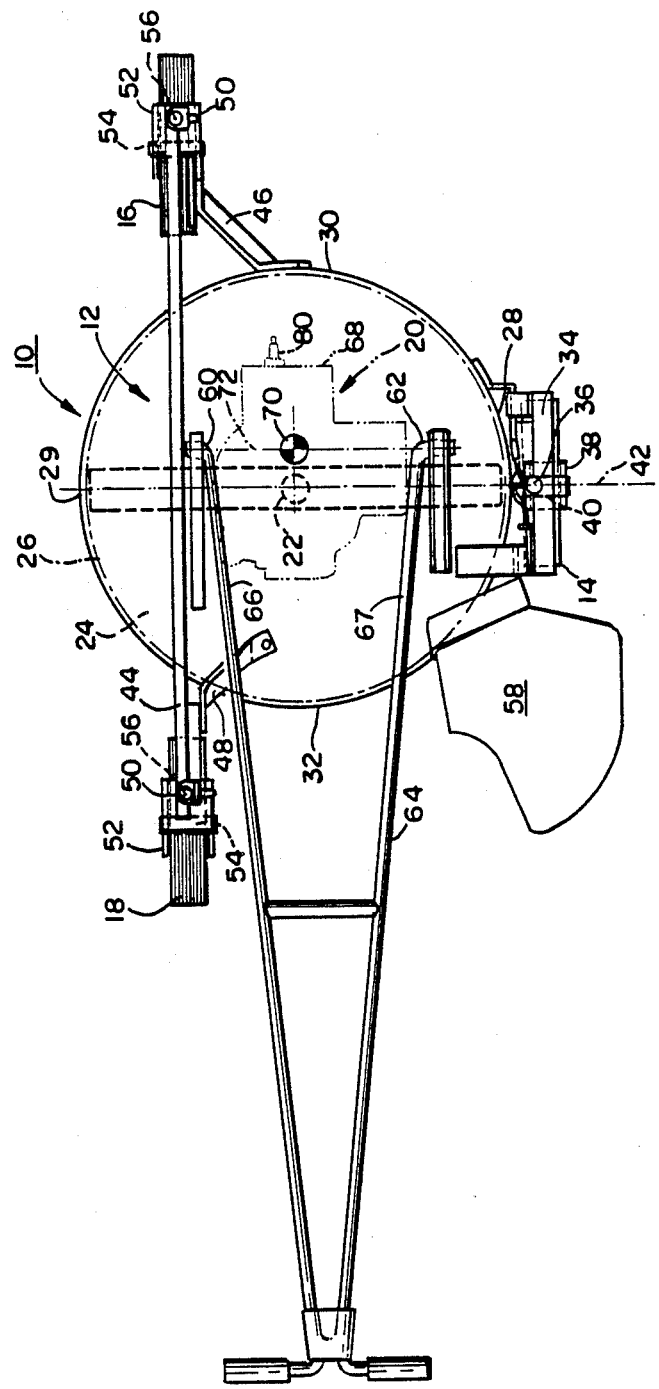
FIG. 2 is a diagrammatic plan view of the lawn mower of FIG. 1.

FIGS. 1 through 3 depict diagrammatically a first preferred embodiment vehicle in the form of a push-type lawn mower 10 in accordance with the present invention. The lawn mower 10 includes a chassis or carriage in the form of a blade housing 12. Three, mutually-spaced, ground-contacting wheels 14, 16 and 18 are coupled with the housing 12 for supporting and moving the mower 10 on the ground. A motor in the form of a small displacement gasoline engine 20 is coupled with and supported by the housing 12. The engine 20 includes a drive shaft 22 (FIG. 2) which is coupled with a cutting blade 24 (all indicated in phantom in FIG. 2), in a conventional fashion, for powering the blade 24 and supporting the blade 24 for generally horizontal rotation generally within the housing 12 to cut grass and the like generally beneath the entire housing 12. The circumference of the cutting area of the blade beneath the housing is indicated by the phantom circle 26 in FIG. 2.

The housing includes generally first and second lateral sides 28 and 29, respectively, and front and rear sides 30 and 32. The first wheel 14 is coupled with the housing 12 about midway along the first lateral side 28 of the housing by means of a first bracket 34 secured to the housing 12 by suitable, conventional means such as welding, to overhang the side 28 of the housing. The first bracket 34 receives a vertical shaft 36 supporting a yoke 38 non-rotatably secured to the shaft 36 beneath the first bracket 34 (see FIG. 3). The shaft 36 is keyed to permit vertical movement with respect to the first bracket 34, for height adjustment of the first wheel 14 with respect to the housing 12, while preventing any rotation of the wheel 14 about the shaft 36. The yoke 38 in turn supports the first wheel 14 on a generally horizontal axle 40 (see FIG. 3) for rotation of the first wheel 14 about only a first generally horizontal axis 42 (see FIG. 2) coaxial with axle 40. The first axis 42 extends generally between the first and second lateral sides 28 and 29 about midway between the front and rear sides 30 and 32, respectively. First wheel 14 is the only wheel supporting the housing 12 which is mounted for rotation about a single axis.

Spaced inwardly from the second lateral side 29 of the housing 12 opposite the first lateral side 28 and generally parallel to the first wheel 14, is an elongated suspension member 44. The member 44 supports the second wheel 16 generally on a front side of the first axis 42 and the third wheel 18 generally on a rear side of the first axis 42. The member 44 is attached to an upper surface of the housing 12, again by conventional means such as spot welding and/or nuts and bolts or the like. Additional bracket members 46 and 48 extend between front and rear ends of the suspension member 44, respectively, to the housing 12 to stabilize and stiffen the coupling of the member 44 to the housing 12. The member 44 in turn couples the second and third wheels 16 and 18 with the housing 12. In particular, each of the wheels 16 and 18 is coupled to the member 44 by a generally vertically extending shaft 50, keyed like the keyed shaft 36 to permit vertical movement but pivotally coupled with a yoke 52 supporting an axle 54 receiving the wheel. In this way, the second and third wheels are each pivotally mounted for rotation about two axes, a generally vertical pivot axis 56 (coaxial with the shaft 50) and a generally horizontal rotation axis (coaxial with axle 54). The housing 12 further includes a grass discharge chute 58 and another pair of brackets 60 and 62 pivotally coupling a handle 64 to the housing 12.

According to one important aspect of the invention, the first wheel 14 is the only one of the three wheels which is mounted for rotation about only a single axis. That axis, the first axis 42, is generally coplanar with the drive shaft 22 and a central longitudinal axis through the blade 24, at least when the blade 24 is aligned parallel with the first axis 42. By generally coplanar, it is emphasized that, in fact, there may be a small horizontal displacement between the first axis 42 and drive shaft 22, preventing the axis 42 and shaft 22 from being truly coplanar. In this fashion, the mower 10 can be turned about any point along the first axis to either side of the first wheel and thus can be turned about any point between the first wheel 14 and the second lateral side 29 of the housing 12 thereby allowing the mower 10 to be turned about any radius down to zero and to any angular extent including 360 degrees or more in a continuous forward motion or on a single spot without raising any of the wheels of the mower 10 off the ground.

According to another important aspect of the invention, the cylinder head 68 of the engine 20 faces forward on the lawn mower 10 for safety and other reasons. As a result, the center of gravity 70 of the lawn mower 10 (excluding the handle 64 which may be shifted in location) is forward of the first axis 42 (see FIG. 2). To minimize drag, the three wheels 14, 16 and 18 should be positioned with respect to the center of gravity 70 of the mower 10 such that each of the wheels supports a substantially identical load so that no wheel sinks more than any other into the ground. To achieve balance with respect to an axis extending longitudinally through the center of gravity (i.e. through the center of gravity 70 and drive shaft 22), the second and third wheels are each spaced laterally from the center of gravity 70 towards the second lateral side 26 a distance approximately one-half the first distance between the center of gravity 70 (and drive shaft 22) and the first wheel 14. Balance about a transverse axis through the center of gravity 70 and perpendicular to the longitudinal axis just referred to, requires some further refinement. Since the center of gravity 70 of the lawn mower 10 does not lie along the first axis 42, to achieve substantially equal weight distribution, each of the wheels 16 and 18 is asymmetrically mounted from the center of the first wheel 14 in a manner which provides substantially uniform weight distribution on all three wheels. As used herein, the phrase "asymmetrically mounted", when referring to the second and third wheels of an embodiment with respect to the first wheel of the embodiment as here, means that as mounted, the second and third wheels cannot be pivoted in any way so that the angle from a point on the first axis 42 such as the center of the first wheel 14 to the center of the second wheel 16 and the distance between the centers of the first and second wheels 14 and 16 are each identical to the angle from the same point on the first axis 42 to the center of the third wheel 18 and the distance between the centers of the first and third wheels 14 and 18, respectively. It is noted with respect to FIG. 3 that each of the axles 54 of the second and third wheels 16 and 18 is laterally displaced from the pivot axis 56 of each wheel (coaxial with the center of the keyed shaft 50 of the wheel) in a wheel trailing orientation for easier turning of the second and third wheels. Also, the keyed shafts 50 and thus the pivot axes 56 of the second and third wheels 16 and 18 are asymmetrically spaced from the keyed shaft 36 and the center of the first wheel 14.

This manner of positioning of the wheels 14, 16 and 18 to balance the loads on all three wheels essentially eliminates a net torque with respect to the center of gravity 70 of the mower 10 from wheel drag or rolling resistance. If a net torque were to develop, it would cause the mower 10 to twist one way or the other. Preferably, the mower 10 is balanced so that the center of gravity 70 lies directly forward the geometric center of the housing 12 and the drive shaft 22 to also equalize drag from the blade 24 on either side of the center of gravity 70.

In addition to equalizing the drag forces, making the mower 10 more predictable and easy to maneuver, the inward spacing of the second and third wheels 16 and 18 from the second side 29 of the housing 12 of the mower 10 provides a second significant advantage of the invention. That is, a portion of the blade 24 extends between and laterally beyond the second and third wheels 16 and 18, away from the first wheel 14 and toward the second lateral side 29 of the housing 12 during each revolution of the blade 24. The maximum lateral extension occurs when the blade 24 is substantially parallel to the first axis 42 as it is shown in FIG. 2. This enables the second lateral side 29 of the mower 10 to be brought up flush against any obstacle. It further allows at least a portion of the housing 12 between the second lateral side 29 and the suspension member 44 and second and third wheels 16 and 18 to pass beneath any overhanging fence or other overhanging obstacles which are higher than the top of the housing 12 but which would interfere with the suspension member 44 or either or both of the second and third wheels 16 and 18.

Another important aspect of the invention illustrated in the push mower embodiment 10 of FIGS. 1 through 3 is the provision of a handle 64 which is pivotally coupled to the housing 12 through the brackets 60 and 62 generally at the center of the housing 12. The handle 64 is coupled with the housing 12 for rotation about a second, generally horizontal axis 72 which is located approximately midway between the front and rear sides 30 and 32 of the housing 12. For the mower 10, this positions the second axis 72 at least generally adjoining a vertical projection through the center of gravity 70. Aligning the second axis 72 with the center of gravity 70 minimizes the force necessary to turn the lawn mower 10. Where the center of gravity 70 is near but not at the center of the housing 12, as is the case with mower 10, the handle pivot rotation axis 72 may be vertically aligned with the first axis 42 or positioned somewhere generally at or between the center of gravity 70 and the first axis 42 to generally balance turning control about the center of the blade 24 with minimum force required for such control. The handle 64 includes a pair of arms 66 and 67, each arm being coupled with the housing 12 on either of two opposing sides of the engine 20.

To enjoy the full advantages of the invention, the handle 64 of the embodiment 10 should be longer than handles conventionally employed with push-type mowers. In particular, it is suggested that the handle 64 be at least about four and one-half feet or more in length to obtain the full mechanical advantage. At this length, the handle 64 is inclined upward at about a 27 degree angle from the horizontal for operation by a normal-sized adult, as is indicated at position A in FIG. 3. Conventional mowers typically have handles positioned at an angle of about 42 degrees from the horizontal when operated by an average-sized adult. In comparison to such handles, the 27 degree operating angle of this handle 64 increases the horizontal propelling component of the applied force by about 20% while reducing the downward vertical component by about 48%. This significantly reduces drag forces, especially when operating on soft ground.

For safety and convenience, the preferred embodiment of mower 10 is designed to be disabled by deliberately or accidentally releasing the handle 46, as indicated at position B in FIG. 3, until it contacts a shut-off device 78 mounted on the top of the housing 12. It is suggested that this cut-off position B be low, such as about 12 degrees above the horizontal so as to allow depression of the handle to at least about 15 degrees above the horizontal during operation without disabling the device 10. This is particularly valuable when the mower 10 is being pushed over the crest of a hill. The device 78 may be a switch or may be as simple as an electrical contact member so that one of the wires of the ignition circuit supplying current to the spark plug 80 of the engine can be grounded to the engine 20 through the device 78 and handle 64, disabling the engine. The device 78 might alternatively or in addition operate in a known and conventional fashion to cause a brake to be applied to the blade or to disengage a clutch between the blade and the engine, or both, if desired.

It is further suggested that the handle 64 be pivotable through the vertical position (C in FIG. 3) so that it may be raised to a self-supporting position (D in FIG. 3) beyond the vertical position and away from the shut-off device 78. In many existing push mowers, a switch is provided in the handle which must be depressed in order to start and run the engine. The described configuration avoids the problem presented to lawn mower users of attempting to start or adjust the engine while simultaneously having to hold the handle. The handle 64 may be supported in the position D by suitable means such as a stop member 82 (see FIG. 3) projecting up from the top of the housing 12 to enable operation of the mower 10 without holding the handle 64. The position D is thus greater than about 60 degrees from the normal operating position A of the handle 64. Since there is no need to use the handle 64 to raise the mower 20 for turning, the handle may indeed by freely pivotable completely over the mower, if desired.

FIG. 4 depicts a riding mower embodiment 100 of the invention which is presently preferred. The mower 100 includes a chassis 102. Referring to FIG. 5, the chassis 102 (in phantom) has first and second lateral sides 104 and 106 and front and rear sides 108 and 110, respectively. A first wheel 114 is mounted to a fixed axle on the first lateral side 104 of the chassis 102 to permit the first wheel 114 to rotate only about a generally horizontal first axis 116. A second wheel 118 is coupled to the chassis 102 and mounted for pivoting about a vertical pivot axis 120 as well as rotating about its central axis coaxial with an axle 122 (FIG. 4) supporting the wheel 118. A third wheel 124 is coupled to the rear of the chassis 102 and mounted so as to pivot about a vertical pivot axis 126 as well as rotate about a generally horizontal central axis coaxial with axle 128. One motor 130 is mounted to and supported from the chassis 102 substantially over the third, rear wheel 124 and is coupled with the rear wheel 124 through any of a variety of conventional means (not depicted) which are employed to power a single pivotable wheel like the third wheel 124. Such couplings are described, for example, in U.S. Pat. Nos. 2,731,096, 2,765,861, 3,110,352 and 3,539,195, all incorporated by reference herein.

Attached to the chassis 102 in a conventional fashion is a separate housing 134. Supported within the housing 134 are a pair of grass-cutting blades 136 and 138 horizontally rotating about staggered vertical axes 140 and 142, respectively (see FIG. 5). Preferably, the mower 100 is provided with a second motor 150 mounted to a front portion of the chassis 102 and coupled with the grass-cutting blades 136 and 138, again through any of a variety of drive trains (not depicted) which are conventionally employed with riding mowers to couple two or more blades to a single motor.

Castered wheels 146 and 148 are provided at the outboard trailing edges of the housing 124 for stability, reducing drag forces and preventing abrasion of the ground by the blades or housing. The castered wheels 146 and 148 do not generally support the chassis 102 upon the ground and would do so only if, for some reason, the housing 134 were forced upwardly by irregularities in the surface of the ground sufficiently to supportingly contact the chassis 102. However, as is illustrated by this embodiment, the provision of additional castered or other types of pivoting wheels (i.e. rotating about two axes) does not effect the maneuverability of the vehicles of the subject invention.

According to an important aspect of the invention, the first wheel 114 is positioned on the chassis 102 such that its central axis 116 is at least substantially aligned with the axis of rotation 140 of the forward blade 136 and with the extreme laterally extending position 154 of that blade 136. Limited only by the degree of rotation which the third wheel 124 can achieve, the mower 100 can be rotated about any point along the first axis 116 between the wheel 114 and this outermost point 154 and any other point along that axis to either side of the wheel 114 and outermost point 154. Again, the second and third pivoting wheels 118 and 124 are asymmetrically spaced with respect to the non-pivotable first wheel 114. Also, the sidemost point 154 of blade 136 extends beyond the second and third pivotable wheels 118 and 124, away from the non-pivotable wheel 114 and toward the second lateral side 106 of the chassis 102, again enabling the vehicle 100 to be brought up against a vertical obstacle and to pass beneath overhanging obstacles which would interfere with one or both of the wheels 118 and 124 or the portions of the chassis 102 raised to accommodate those wheels. (See FIG. 4)

The present embodiment discloses other additional important aspects of the invention. By utilizing two separate, small motors 130 and 150 (which may be either gas or electric), rather than a single larger motor, the center of gravity of the vehicle 100 can be lowered considerably in that the operator's seat 156 and the second engine 150 can be placed between the pivoting wheels 118 and 124, virtually directly on the housing 134 and blades 136 and 138. Moreover, by utilizing separate motors for driving the rear wheel 124 and the blades 136 and 138, the subject invention eliminates complicated and break-down prone drive trains which must be employed to divide and transfer torque from a single engine to both the wheel(s) and the blade(s).

Again, the second and third pivotable wheels 118 and 124 are asymmetrically mounted with respect to the first, non-pivotable wheel 114. One skilled in the art will appreciate that while balancing the loads evenly on the push mower 10 is desirable for ease of control and pushing the mower, it is not as critical with a powered vehicle like the riding mower 100. Indeed, it is usually more significant to imbalance the loads on the wheels of such an embodiment to place a heavier load on the driving wheel 124 to maximize traction. A single powered rear wheel maximizes traction when driving up grades in comparison to many conventional three-wheeled riding mowers having a pair of driven front wheels. Thus, asymmetry among the wheels is typically even more pronounced in riding than in push-type embodiments of the invention.

FIG. 6 depicts the essential elements of yet another embodiment of the invention preferred for use with ground-working implements such as brushes, scrapers, reel-type lawn mowers, rink ice resurfacers (Zambonis), etc. having a transverse axis of rotation or of contact with the ground. In FIG. 6, a vehicle 200 includes a first, rotatable but non-pivotable wheel 202 and second and third pivoting and rotating wheels 204 and 206 coupled with a chassis 208 (indicated in phantom). The chassis 208 supports, in some conventional manner, a ground-working implement 210 such as a brush, scraper, reel, etc. having a generally horizontal longitudinal axis 212. The axis 212 is also an axis of rotation for rotating implements. The axis 212 is generally vertically aligned with the axis of rotation 214 of the first wheel 202 and with an axis of contact of the implement 210 with the ground beneath the chassis 208 (indicated in phantom). While the longitudinal axis 212 of the implement 210 is indicated as being parallel to the first axis, the beneficial results of this invention can be enjoyed even where the axis 212 is skewed as long as the implement 210 crosses the first axis 214, preferably at the lateral side of the vehicle 200 opposite the first wheel 202. Again, the second and third wheels 204 and 206 are asymmetrically mounted with respect to the first wheel 202 and a portion of the ground-working implement 210 extends beyond the second and third wheels 204 and 206, away from the first wheel 202 and toward an opposing lateral side of the chassis. The pivotable wheels 204 and 206 are located generally to front and rear sides, respectively, of the first axis 214 and the first wheel 202. The "rear" wheel 206 is typically the driving and steering wheel.

FIG. 7 depicts diagrammatically the essential components of a preferred configuration of the invention for an edger or trimmer 300. The edger or trimmer includes first, second and third wheels 302, 304 and 306, respectively, mutually spaced and coupled to and supporting a frame or carriage 308 (in phantom) for movement of the device 300 on the ground. The carriage 308 in turn supports, in a conventional fashion, a blade 310 in a substantially vertical orientation in an edger configuration or a substantially horizontal orientation in a trimmer orientation. The circumference of the cutting area of the blade 310 in the horizontal configuration is indicated by the circle 311. The blade 310 rotates about an axis 312 which may be either vertically or horizontally oriented. The vertical orientation is indicated diagrammatically by reference numeral 312'. The first wheel 302 is coupled with the carriage 308 so as to rotate only about a generally horizontal first axis 314 fixed with respect to the carriage 308 and preferably generally coplanar with the rotation axis 312 (and 312') of the blade 310. The second and third wheels are pivotably mounted for rotation about two axes. As is further indicated, in its horizontal orientation, a portion of the blade 310 extends between and beyond the second and third wheels 304 and 306, away from the first wheel 302. The second and third wheels 304 and 306 are also asymmetrically mounted with respect to the first wheel 302.

While the invention has been described with regard to a variety of vehicles and ground-working implements, one of ordinary skill in the art would appreciate that vehicles according to the invention may be adapted in conventional ways to carry other ground-working implements including, but not limited to devices such as power paint sprayers used for line painting and which, like the blades of the various lawn mower embodiments of the invention, operate on but do not necessarily contact the ground. Moreover, while individual wheels have been described, one of ordinary skill in the art will appreciate that two or more tandem wheels may be substituted.

While various embodiments have been described and changes thereto suggested, it will be recognized by those skilled in the art that other changes could be made to the above-described embodiments and other embodiments of the invention created without departing from the broad inventive concepts thereof. It is understood, therefore, that this invention is not limited to the particular embodiments disclosed, but it is intended to cover any modifications which are within the scope and the spirit of the invention, as defined by the appended claims.

I claim:

1. A work vehicle comprising:
   a chassis having generally front, rear, first lateral and second lateral sides;
   three ground-contacting wheels coupled with the chassis for supporting, turning and moving the vehicle on the ground;
   a first one of the three wheels being positioned generally on the first lateral side of the chassis, the first wheel being mounted for rotation about only a generally horizontal, first axis fixedly extending laterally towards the second lateral side;
   a ground-working implement coupled with the chassis for working at least generally beneath the second lateral side of the chassis generally opposite the first wheel;
   a second one of the three wheels being positioned generally to a front side of the first axis and being mounted to the chassis for rotation about two axes including a generally vertical pivot axis;
   a third one of the three wheels being positioned generally to a rear side of the first axis and being mounted to the chassis for rotation about two axes including a generally vertical pivot axis; and
   the vehicle having a center of gravity positioned among the three wheels, the first wheel being spaced laterally from the center of gravity towards the first lateral side a first distance and the second wheel and third wheel each being spaced laterally from the center of gravity towards the second lateral a side distance approximately one-half the first distance to distribute substantially the same portion of the weight of the vehicle on each of the three wheels.

2. The work vehicle of claim 1 further comprising a handle coupled with the chassis for free rotation about a second axis between a vertical position and an angle at least as low as about twenty-seven degrees with respect to the ground while transferring force from the operator towards the vehicle, the second axis extending generally between the first and second lateral sides and located approximately midway between the front and rear sides of the chassis.

3. The work vehicle of claim 2 further comprising motor means coupled with the implement for powering the implement.

4. The work vehicle of claim 3 wherein the handle includes a pair of arms, each arm being coupled with the chassis on either of two opposing sides of the motor means.

5. The work vehicle of claim 4 wherein the handle is rotatable through an angle of greater than 60 degrees about the second axis.

6. The work vehicle of claim 5 further comprising control means mounted to the chassis and operable by depression of the handle for disabling the implement by disabling the motor means.

7. The work vehicle of claim 6 configured as a lawn mower.

8. The work vehicle of claim 2 wherein the handle is coupled to the chassis for the free rotation between a lower position at an angle not more than about 15° from the ground supporting the vehicle to the vertical position, the handle passing through a 90° angle with respect to the ground when moving between the lower position and the vertical position and the work vehicle further comprising stop means coupled with the chassis for contacting the handle in the vertical position and supporting the handle in a generally upright orientation in the vertical position.

9. The work vehicle of claim 1 wherein a portion of the implement extends between and beyond the second and third wheels at least towards the second lateral side of the chassis during at least a portion of the time the implement is working.

10. The work vehicle of claim 1 further comprising motor means including a drive shaft coupled with the implement, the drive shaft being generally coplanar with the first axis.

11. The work vehicle of claim 10 configured as a lawn mower wherein the implement is a first rotary blade.

12. The work vehicle of claim 1 configured as a line painter.

13. A driven work vehicle comprising:
    a chassis generally having front, rear, first and second sides;
    three asymmetrically spaced, ground contacting wheels coupled with the chassis for supporting, moving and turning the vehicle on the ground;
    a ground contacting implement supported from the chassis generally beneath the chassis;
    a first of the three wheels being positioned generally outboard on a first lateral side of the chassis, the first wheel being mounted for rotation about a first fixed horizontal axis, the first axis generally coinciding with the center of gravity of the vehicle;

a second wheel being positioned generally towards a second lateral side of the chassis, the second wheel being mounted for rotation about two axes, including a horizontal axis and generally vertical pivot axis, the second wheel being positioned forward of the center of gravity of the chassis and the axis of the first wheel;

a third wheel being positioned generally to the rear of the chassis and the first wheel axis and laterally between the first and second wheels, the third wheel being mounted for rotation about two axes, including a horizontal axle and generally vertical pivot axis; and motor means coupled to the third wheel for driving the vehicle.

14. The work vehicle of claim 13 further comprising a seat for the driver positioned in front of the third wheel and recessed among the three wheels.

15. The work vehicle of claim 13 wherein the third wheel is used for steering the vehicle.

16. The work vehicle of claim 15 wherein the second wheel is castered and free to follow the controlled direction of the vehicle controlled by the third wheel.

17. The work vehicle of claim 13 further comprising a housing coupled with the chassis and supporting the implement, the housing being supported by at least two caster wheels, one caster wheel being located on the first lateral side and inboard of the first wheel, the other caster wheel being located on the second lateral side and generally in longitudinal alignment with the second wheel.

18. The work vehicle of claim 13 wherein the ground working implement has an axis of rotation positioned generally vertically aligned with the axis of the first wheel and the implement extends from a position among the three wheels to a position outboard of the second wheel on the second lateral side of the chassis.

19. The work vehicle of claim 13 wherein a second motor means is mounted on a forward end of the chassis for driving the implement.

20. The work vehicle of claim 13 configured as a lawn mower generally having two horizontally rotating blades.

21. The work vehicle of claim 13 configured as an ice levelling machine.

22. The work vehicle of claim 13 configured as a sweeper wherein the implement is a cylindrical brush having a horizontal axis of rotation.

* * * * *